United States Patent [19]
Hehl

[11] Patent Number: 5,223,281
[45] Date of Patent: Jun. 29, 1993

[54] MOLD CARRIER IN AN INJECTION MOLDING MACHINE

[76] Inventor: Karl Hehl, Arthur-Hehl-Strasse 32, W-7298 Lossburg 1, Fed. Rep. of Germany

[21] Appl. No.: 782,628

[22] Filed: Oct. 25, 1991

[30] Foreign Application Priority Data

Oct. 31, 1990 [DE] Fed. Rep. of Germany ....... 4034577

[51] Int. Cl.⁵ .............................................. B29C 45/56
[52] U.S. Cl. .................. 425/575; 264/328.11
[58] Field of Search ............... 425/547, 574, 575, 576; 264/328.9, 328.11

[56] References Cited
U.S. PATENT DOCUMENTS 4,865,543 9/1989 Hehl ..................................... 425/547

*Primary Examiner*—Tim Heitbrink
*Attorney, Agent, or Firm*—Spencer, Frank & Schneider

[57] ABSTRACT

By an injecting unit, which is horizontally shiftable at right angles to the injection axis, plastic material is adapted to be injected into injection mold sections which can selectively be fixed to a stationary mold carrier. The moldside ends of piston rods of the advance-retract cylinders of the injecting unit are contained in and adapted to be fixed to sleeves provided on a sleeve carrier, which is slidably mounted on the mold carrier. Between the sleeves, the sleeve carrier is formed with an opening for receiving the plasticizing cylinder of the injecting unit. The sleeve carrier substantially covers the cylinder-receiving opening of the mold carrier in those areas which are not occupied by the plasticizing cylinder at a time. In such an injection molding machine it is possible to provide injecting units in which the piston rods of the advance-retract cylinders lie in a horizontal plane.

19 Claims, 9 Drawing Sheets

MOLD CARRIER IN AN INJECTION MOLDING MACHINE

BACKGROUND OF THE INVENTION

1. Field of the Invention

This invention relates to an injection molding machine comprising a horizontally movable clamping unit, a horizontally injecting injecting unit and a stationary mold carrier adapted to selectively carry a center gate injection mold section having a center gate and defining a central mold cavity and an off-center gate injection mold section having an off-center gate and defining a central mold cavity. The injecting unit is horizontally shiftable between two mutually opposite extreme injecting positions transversely to the injection axis of said injecting unit and is operable in said injecting positions to inject plasticized plastic material into the parallel gates of said two molds. Said mold carrier is formed with a cylinder-receiving opening, which is adapted to receive the plasticizing cylinder of the injecting unit and is approximately symmetrical to the horizontal plane of symmetry of the mold carrier and elongated in the direction in which said injecting unit is horizontally shiftable. The machine also comprises two advance-retract cylinders for moving said plasticizing cylinder into and out of engagement with said mold section, and also comprises guiding means for guiding the piston rods of the advance-retract cylinders. Said piston rods extend as far as to said mold carrier and during the shifting of the injecting unit are horizontally guided, and said piston rods are disposed on the left and right, respectively, of said cylinder-receiving opening. Means are provided for locking said piston rods in their axial position. The invention relates also to a stationary mold carrier for use in such machine.

2. Description of the Prior Art

An injection molding machine of that kind has been disclosed in U.S. Pat. No. 4,865,534 and permits a selective use of off-center gate injection molds which have a central mold cavity and an off-center gate, which may be disposed at different locations. In that machine the plasticized plastic is injected into the mold cavity through a gate which is approximately parallel to the direction of the mold-closing movement of the clamping unit. That gate opens into the mold cavity near the edge thereof. Such a gate may be described as a parallel gate to distinguish it from a gate which extends at right angles to the direction of said mold-closing movement and opens into the mold cavity in the parting plane of the injection mold. In the known injection molding machine the moldside ends of the piston rods of the advance-retract cylinders are guided in T-section grooves of the mold carrier as the injection unit is shifted between different injecting positions. During the injection of the plastic material, the piston rods are subjected to a force which opposes the pressure under which the plasticizing cylinder is forced against the mold and said force forces the piston rod ends against vertical side faces of the grooves of the mold carrier to hold the piston rods in position. As it is necessary to provide the grooves above and below the cylinder-receiving opening, the known mold carrier can be used only in injection molding machines in which the piston rods are symmetrically disposed with respect to the injection axis and arranged in a plane that includes an angle with the horizontal.

SUMMARY OF THE INVENTION

The present invention is based on the recognition gained in experiments conducted through many years that in the making of high-precision injection moldings having various shapes and sizes and in the injection molding of plastic materials having different physical properties an injection molding machine having parallel gates may not be capable of meeting all requirements which may arise in practice as regards injection molding technology because it may not be possible in all cases to use a gate of the kind which is an optimum from the aspect of flow dynamics in view of the shape of the molding and the physical properties of the plastic material as these requirements could be met only if the injecting unit was turned to a position for injecting in the parting line of the injection mold.

In view of that recognition it is an object of the invention to provide an injection molding machine which is of the kind described first hereinbefore and in which the stationary mold carrier is so designed that it is possible to use in the machine an injecting unit which is operable to inject in parallel directions and advance-retract piston rods lying in a horizontal plane.

In an injection molding machine of the kind described first hereinbefore that object is accomplished in that said piston rods of the advance-retract cylinders lie approximately in the horizontal plane of symmetry of the mold carrier and their moldside ends are contained in and fixed to sleeves of at least one sleeve carrier, which is slidably guided in said guiding means and is formed between said sleeves with an opening for receiving said plasticizing cylinder and substantially covers the cylinder-receiving opening of the mold carrier in those areas which are not occupied at a time by said plasticizing cylinder.

Such an injection molding machine will also meet the requirements for a selective use of a given mold carrier with injecting units differing in size and used for injecting in parallel directions. The injection axis of the injecting unit can substantially continuously be adjusted for adaptation to different injection molds.

During the injection molding operation the sleeve carrier is fixed by clamp screws to the mold carrier in an adjusted position but may alternatively be locked in different ways, as will be the case when the sleeve carrier is normally received with a backlash in the guiding means of the mold carrier. Such alternative ways of locking the sleeve carrier in its operative position may utilize the tensile force which is exerted on the piston rods owing to the pressure applied by the plasticizing cylinder to the injection mold and which imparts to the sleeve carrier a slight movement in the direction of the injection axis and forces the sleeve carrier against adjacent portions of the guiding means. When the plasticizing cylinder is out of contact with the mold as the injecting unit is shifted, the sleeve carrier will automatically be carried along. It will be understood that the sleeve carrier may alternatively be moved manually to different operating positions when the piston rods of the advance-retract cylinders have been removed from the sleeves carried by the sleeve carrier.

The guiding means of the mold carrier may comprise guiding elements, which are anchored in the mold carrier and which have surface-ground surface portions facing the top and bottom longitudinal edge portions of the platelike sleeve carrier on opposite sides thereof, and the sleeve carrier may be adapted to be locked to the mold carrier in different relative positions by being forced against the guiding elements of the mold carrier. The guiding elements may be cylindrical and may be formed with two recesses, which correspond to respective segments of a cylinder and define horizontal and vertical guiding surfaces, respectively, and the guiding elements may be provided with axial centering flanges and adapted to be forced against the mold carrier in centered positions by means of fixing screws, which are coaxial to said flanges. These features permit the sleeve carrier to be guided and locked reliably and in a simple manner in guiding means which can be manufactured economically.

During the injection of the plastic material into an off-center injection mold the coaxial fixing screws may be in threaded engagement with tapped bores, which are formed in the mold carrier and in the direction of the shifting movement are spaced from other tapped bores for thread engagement with said screws when the plastic material is to be injected into a center gate injection mold. In that case the bending stress set up in the sleeve carrier under the tensile force exerted on the piston rods will be reduced because the screws by which the sleeve carrier is fixed to the mold carrier are closer to the points acted upon by the piston rods. Besides, the sleeve carrier may be relatively small in size.

The sleeve carrier may have surface-ground clamping surfaces and a first pair of sleeve elements integrally formed with sleeves and a second pair of sleeve elements having integrally formed sleeves may selectively be fixed to said sleeve carrier at said clamping surfaces by clamp screws and may be centered by means of centering pins of the sleeve carrier, which centering pins lie in a common vertical plane with the clamp screws. The sleeve elements of the two pairs thereof may differ as regards the spacing of their sleeves and/or as regards the inside width of their sleeves. Alternatively, at least two mold carriers may selectively be provided and may differ as regards the spacing of their sleeves and/or as regards the inside width of their sleeves. With these features it will be possible to use piston rods which differ in diameter and in the spacing of their axes.

The sleeve carrier may consist of two sleeve carrier sections, which define the opening of the sleeve carrier on opposite sides thereof. In that case the opening for receiving the plasticizing cylinder can be adjusted to the diameter of the plasticizing cylinder which is employed.

The sleeve carrier may have a backlash in the guiding elements during the shifting of the injecting unit when the plasticizing cylinder is clear of the injection mold and by a slight clamping movement in the direction of the injection unit may be forced against vertical guiding surfaces so that the sleeve carrier is then locked in position.

DETAILED DESCRIPTION OF THE PREFERRED EMBODIMENTS

Figure 1:
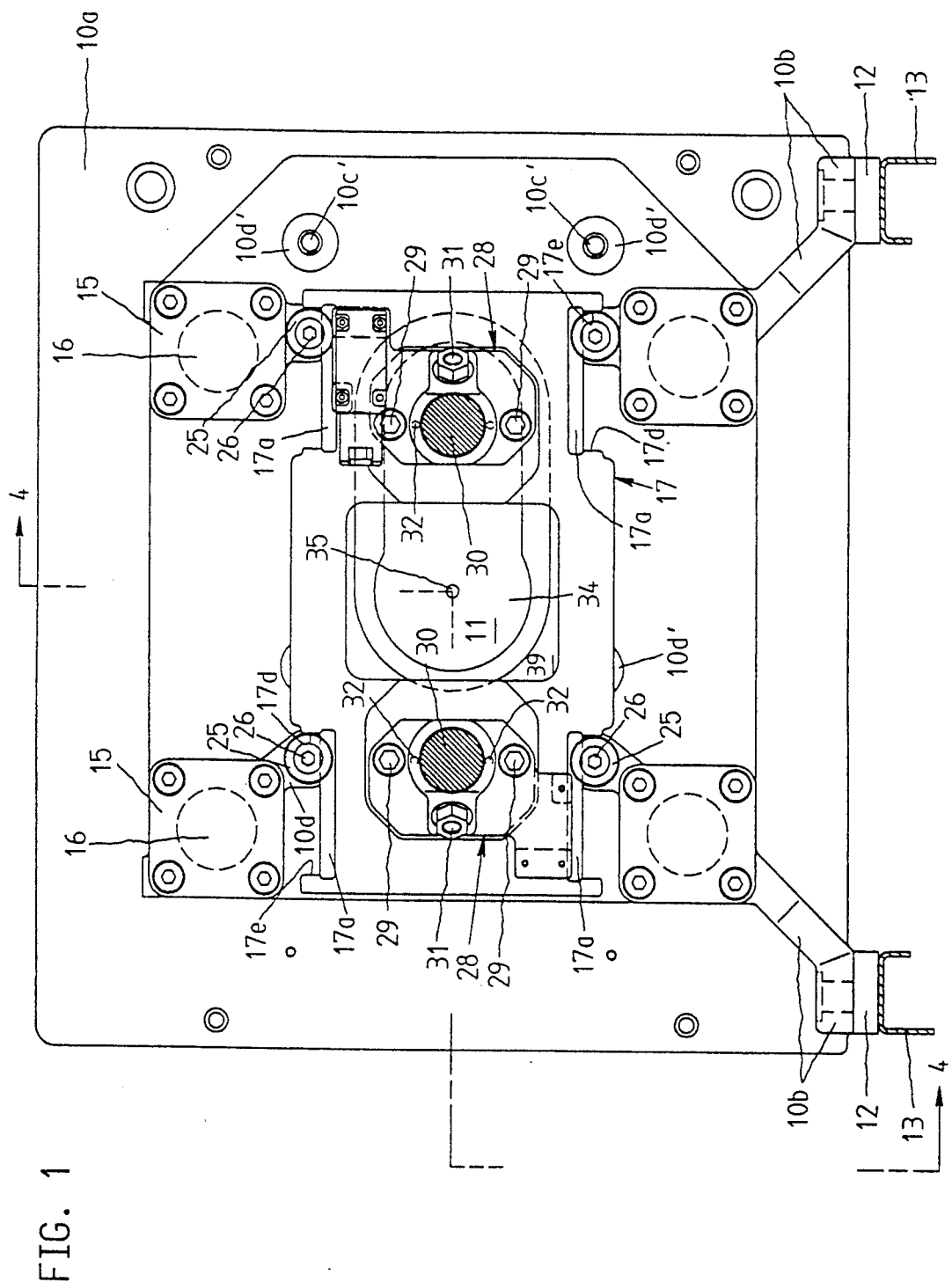
FIGS. 1 and 2 show an assembly comprising the mold carrier and a sleeve carrier provided with separated sleeve elements. Said assembly is shown in FIGS. 1 and 2 in positions for a central injection and for an off-center injection.

Illustrative embodiments of the invention will now be described more detail with reference to the drawing.

Figure 2:
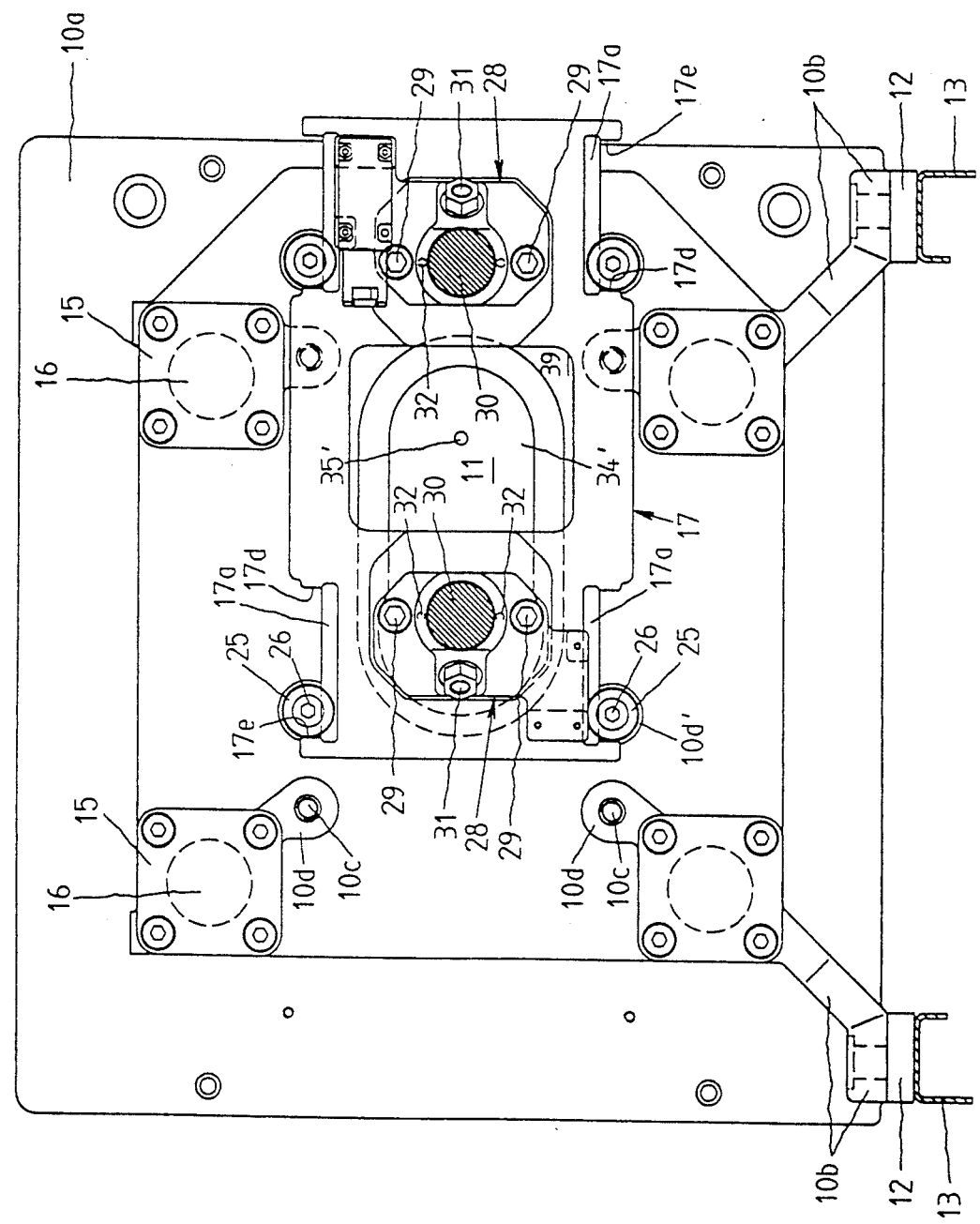
Figure 3:
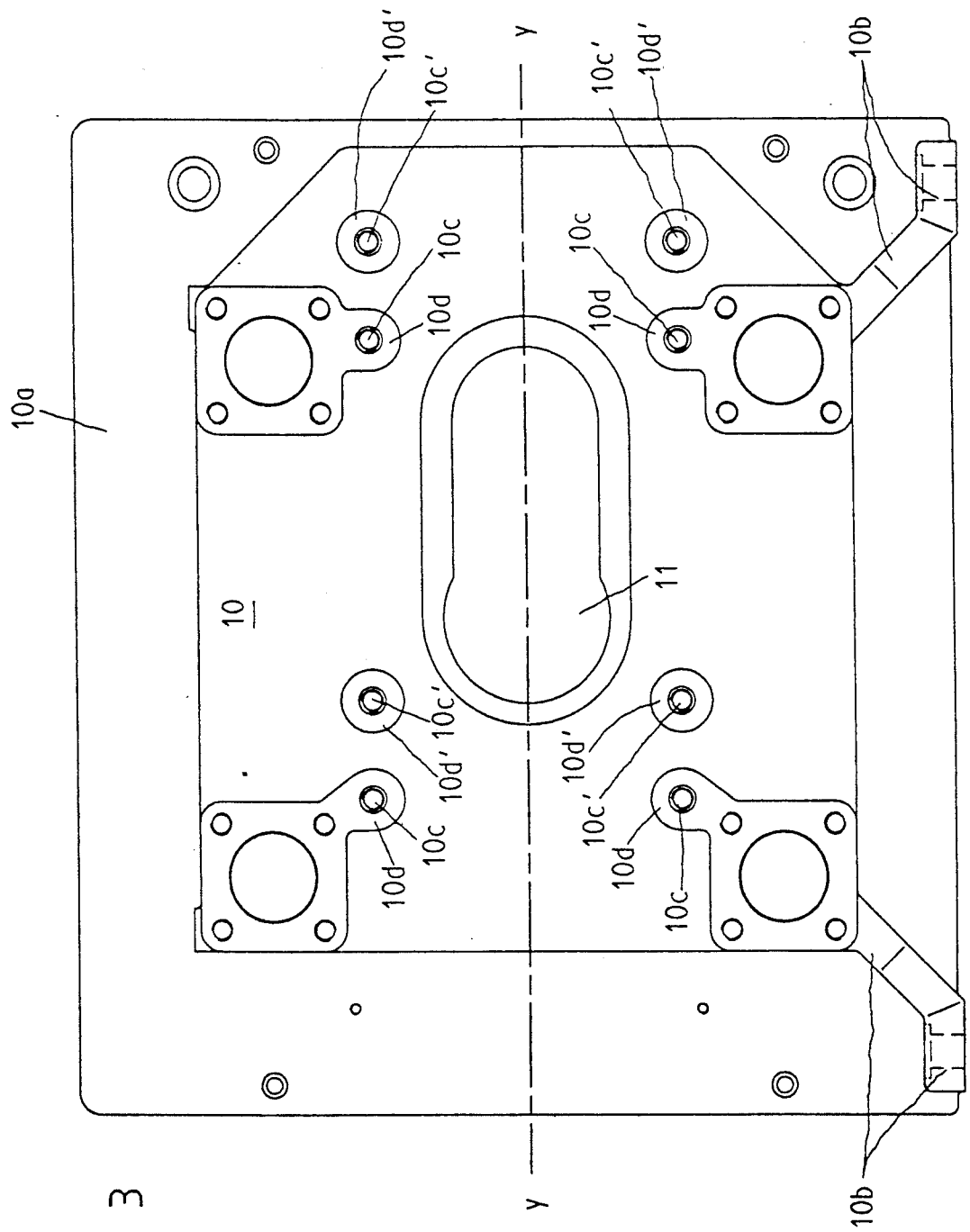
FIG. 3 shows the mold carrier of FIGS. 1 and 2 without the sleeve carrier.
Figure 5:
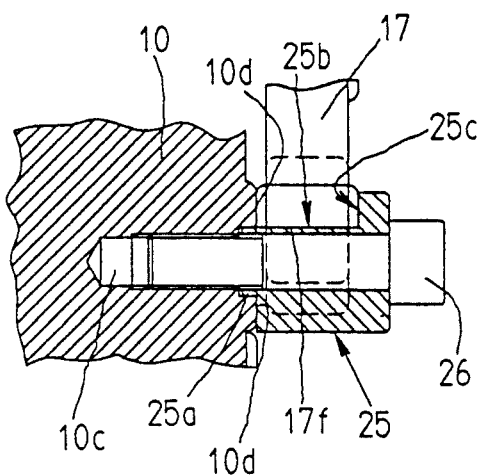
FIG. 5 is an enlarged fragmentary view showing a portion of FIG. 4.
Figure 4:
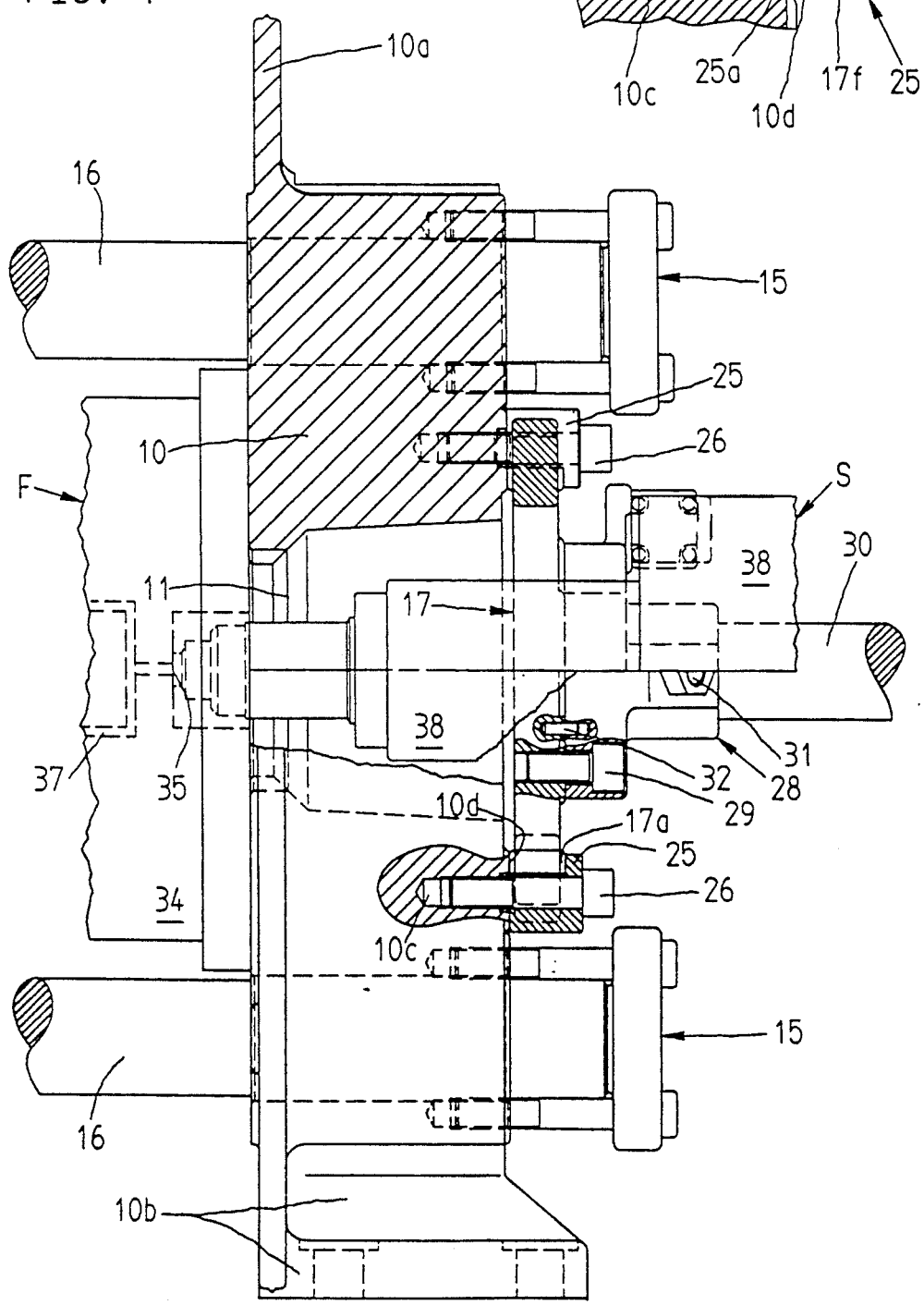
FIG. 4 is a side elevation showing the sleeve carrier of FIGS. 1 and 2 together with the injection mold section fixed to the mold carrier and the associated plasticizing cylinder and is partly a sectional view taken on line 4—4 in FIG. 1.
Figure 7:
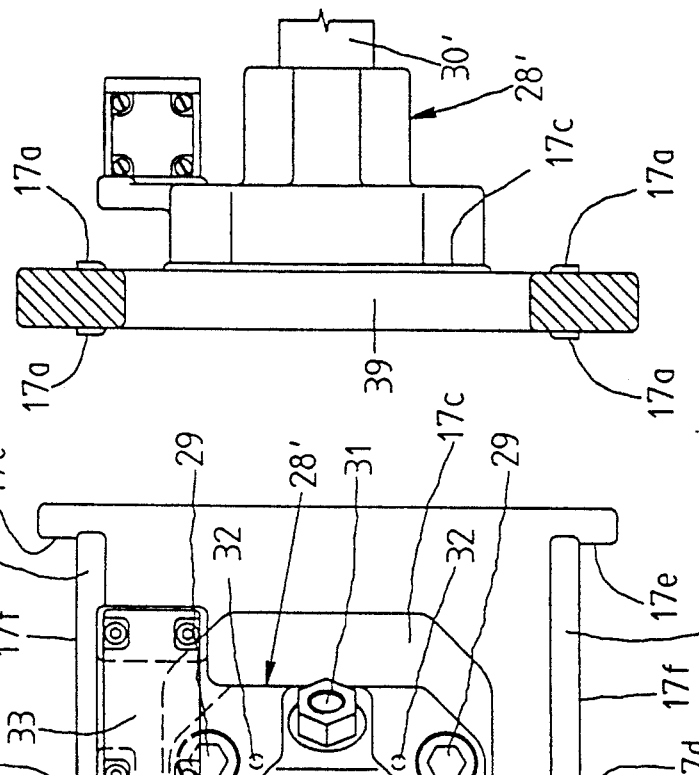
FIGS. 6 and 7 are, respectively, a side elevation and a sectional view taken on line 7—7 in FIG. 6 and show the same sleeve carrier as FIGS. 1 and 2 but with different sleeve elements.
Figure 6:
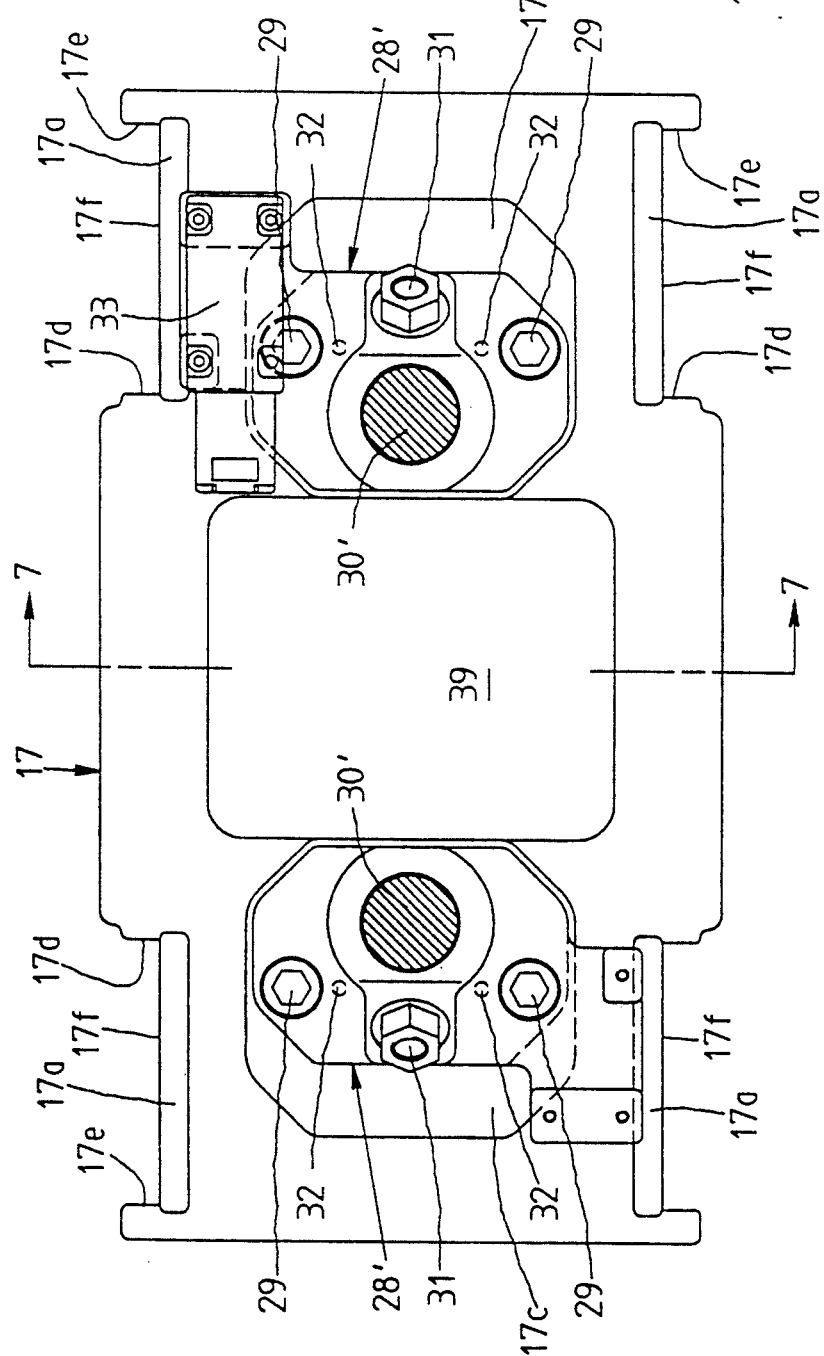
Figure 9:
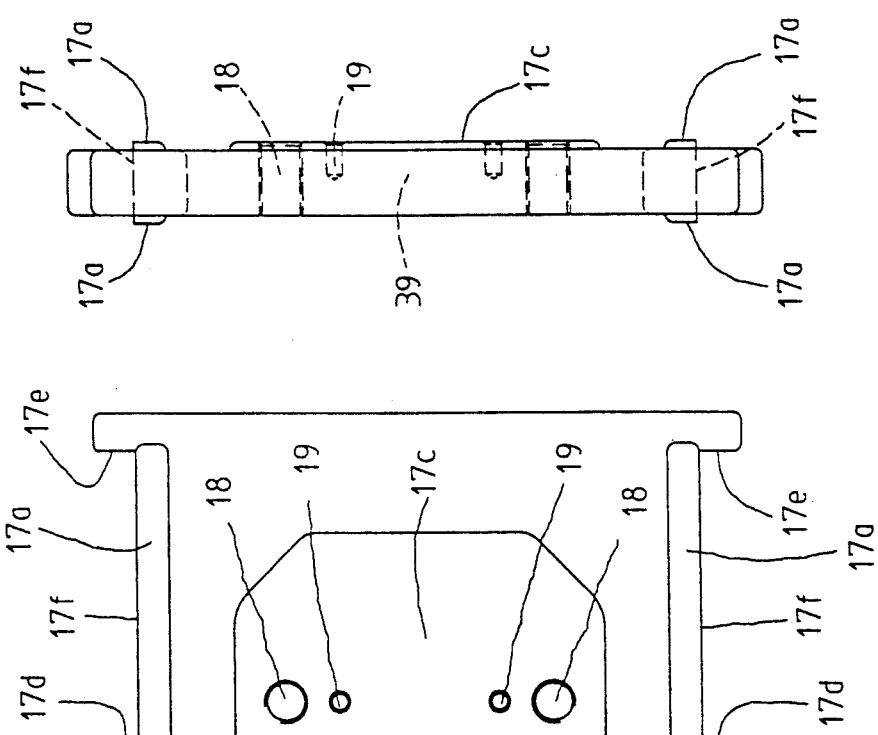
FIGS. 8 and 9 are views which are similar to FIGS. 6 and 7, respectively and show the sleeve carrier without sleeve elements.

The stationary mold carrier 10 is included in a horizontally movable clamping unit F (FIG. 4) of an injection molding machine, which also comprises an injecting unit S (FIG. 4) for injecting in a horizontal direction. The clamping unit also includes guide rods 16 for guiding a nonillustrated movable carrier. The guide rods 16 extend through the stationary mold carrier 10 and are attached thereto by clamping means 15. The mold carrier 10 is provided with a stiffening edge flange 10a, which is thinner than the body of the mold carrier. The mold carrier 10 is also provided with supporting ribs 10b, which support the mold carrier 10 on rails 12 of the machine frame 13. A stationary center gate injection mold section 34 (FIG. 4), which has a central gate 35 and together with a movable mold section (not shown) constitutes a center gate injection mold having a central mold cavity 37 is fixed to the mold carrier 10. Stationary off-center gate mold sections 34' which have off-center gates 35' and together with a movable mold section (not shown) constitutes an off-center gate injection mold having a central mold cavity can alternatively be fixed to the mold carrier 10. Plasticized plastic material can be injected into the injection mold section 34 and 34' by means of the injecting unit S, which can be shifted parallel to itself in a horizontal direction at right angles to its injection axis s—s. The injection can be effected when the injecting unit S is in either of two extreme injecting positions and in intermediate injecting positions, and in all injecting positions the injection axis will be parallel to the direction of the mold-closing movement of the clamping unit. Such an injection will be described hereinafter as a parallel injection. The mold carrier 10 is formed with a cylinder-receiving opening 11, which is approximately symmetrical to the horizontal plane of symmetry y—y (FIG. 3) of the mold carrier and is elongated in the direction of the shifting movement of the injecting unit S and adapted to receive the plasticizing cylinder 38 (FIG. 4) of the injecting unit S. By means of hydraulic advance-retract cylinders the plasticizing cylinder 38 is adapted to be forced against the injection mold section 34 or 34' which has been mounted on the mold carrier 10. Said advance-retract cylinders are provided with piston rods 30, which are adapted to be coupled to the mold carrier 10, which is provided with guiding elements 25 for indirectly guiding the moldside ends of the piston rods 30 as the injecting unit S is shifted. Said guiding elements 25 must obviously be disposed on the right and left of the cylinder-receiving opening 11. The piston rods 30 lie approximately in the horizontal plane of symmetry y—y of the mold carrier 10 and their moldside ends are indirectly guided in that they are contained in sleeves carried by at least one sleeve carrier 17, 17' or 17'', which is slidably guided by the guiding elements 25. Between the sleeves the sleeve carrier has an opening 39 for receiving the plasticizing cylinder 38. The sleeve carrier substantially covers the cylinder-receiving opening 11 of the mold carrier 10 in those areas which are not occupied at a time by the plasticizing cylinder 38. In each of the two mutually opposite, extreme injecting positions of the injecting unit and the corresponding positions of the piston rods 30 the sleeve carrier covers the cylinder-receiving opening 11 in about one-half of its area, as is apparent from FIGS. 1 and 2. The guiding elements 25 are mounted on the mold carrier 10 and face surface-ground surface portions 17a provided on the platelike sleeve carrier 17 or 17' or 17'' at its top and bottom longitudinal edge portions on opposite sides. The mold carrier 10 has two orthogonal planes of symmetry and comprises two pairs of such surface portions, which are symmetrical to the planes of symmetry of the sleeve carrier. As is apparent from FIGS. 7, 13, 15 the finish-ground sliding and clamping surface portions protrude from the two broadside surfaces of the sleeve carrier 17. The sleeve carrier is adapted to be locked to the mold carrier in different positions. Each of the cylindrical guiding elements 25 is formed with an opening, which corresponds to a segment of the cylinder, so that each guiding element 25 has a horizontal guiding surface 25b and a vertical guiding surface 25c (FIG. 5) for guiding the sleeve carrier 17 or 17' or 17'': The guiding elements 25 are provided with axial centering flanges 25a and can be forced against and centered relative to the mold carrier 10 by means of fixing screws 26, which are coaxial to the flanges 25a. As is particularly apparent from FIGS. 1 and 2 in conjunction with FIG. 3, for an injection of plastic material into a selectively mounted stationary off-center gate mold section 34' of an off-center gate injection mold, as is shown in FIG. 2, the screws 26 are in threaded engagement with tapped bores 10c', which are formed in the mold carrier 10 and in the direction of the shifting movement of the injecting unit S are spaced from similar tapped bores 10c for threaded engagement with the screws 26 when the plastic material is to be injected into the center-gate mold section 34.

In the embodiments shown in FIGS. 1 to 11 a first pair of sleeve elements 28 having integrally formed sleeves and a second pair of sleeve elements 28' having integrally formed sleeves can alternatively be clamped by clamp screws 29 against surface-ground clamping surfaces 17c of the sleeve carrier 17. The sleeve elements 28 and 28' are adapted to be centered on the sleeve carrier 17 by centering pins 32 of the latter, which lie in the same vertical plane a—a (FIG. 8) as the clamp screws 29. The sleeve elements 28 and 28' of said pairs differ as regards the spacing and the inside width of their sleeves.

Figure 13:
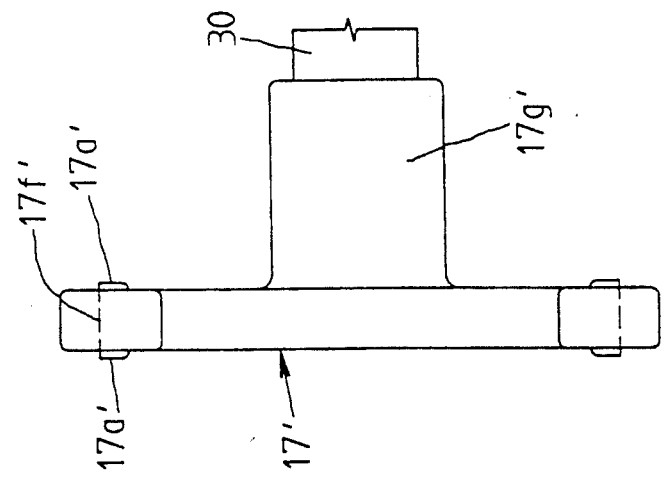
FIGS. 12 and 13 are, respectively, one part of a bipartite sleeve carrier.
Figure 12:
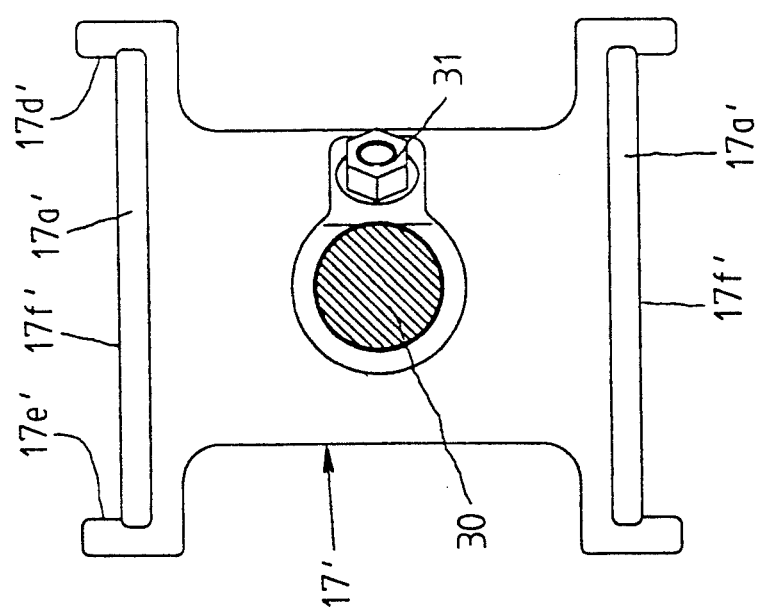

In the illustrative embodiment shown in FIGS. 12 and 13 the sleeve carrier 17' consists of two juxtaposed parts, which are shown in FIGS. 12 and 13. The finish-ground surface portions 17a of one sleeve carrier part face guiding elements fixed to the left-hand half of the mold carrier. The finish-ground surface portions 17a of the other sleeve carrier part face guiding elements 25, which are fixed to the right-hand half of the mold carrier 10. As a result, those edges of the two sleeve carrier parts which face the injection axis define an opening 39 for receiving the plasticizing cylinder 38. The two sleeve carrier parts are identical and are integrally formed with sleeves.

Figures 14, 15:
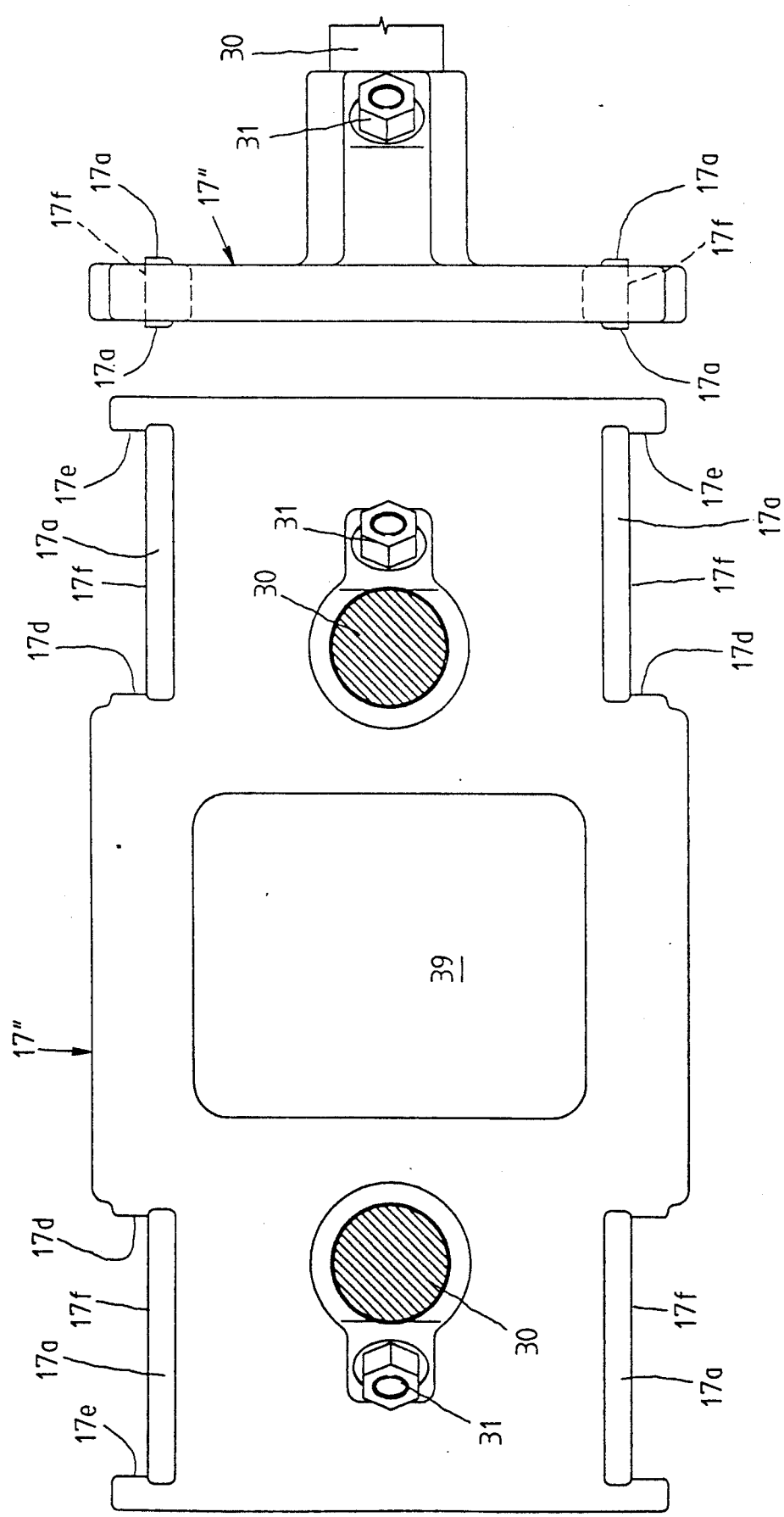
FIGS. 14 and 15 are, respectively, an end elevation and a side elevation showing a sleeve carrier which is integrally formed with sleeves.

In the illustrative embodiment shown in FIGS. 14 and 15 the sleeves are integrally formed with an integral sleeve carrier 17''. In that case, two or more of such sleeve carriers 17'' may selectively be used with the mold carrier and may differ as regards the spacing and/or the inside width of their sleeves.

In certain cases it may be desirable to provide two pairs of sleeves, which are integrally formed with the sleeve carrier parts shown in FIGS. 12 and 13 or with the sleeve carrier parts shown in FIG. 14 and which differ as regards the spacing of their sleeves and/or the inside width of their sleeves.

In general, all of the sleeve carriers 17, 17', and 17'' which have been described hereinbefore may be displaceable with a lateral backlash in the guiding elements 25 as the injecting unit S is shifted. That backlash will exist if the axial depth of the guiding elements 25 exceeds the thickness of the sleeve carrier plate 17 adjacent to its finish-ground surface portions 17a. In that case it will be possible to lock the sleeve carrier 17 or 17' or 17'' in that it is clamped by a slight movement in the direction of the injection axis s—s against the vertical guiding surfaces (FIG. 5) of the guiding elements. Such a clamping will automatically be effected when the plasticizing cylinder 38 is forced against the stationary injection mold section.

In all embodiments described, the surface-ground portions 17a of the sleeve carrier 17 or 17' or 17'' are formed with low-friction surfaces, which are slidable on the vertical guiding surfaces 25c of the guiding elements 25 and/or on annular guiding surfaces 10d of the mold carrier 10 or 10d' when the plastic material is to be injected into the off-center gate mold section 34' (FIG. 2). The guiding surfaces 10d, 10d' also protrude from the rear broadside surface of the mold carrier 10. The portions 17a comprise horizontal surfaces 17F as are defined by vertical engaging surfaces 17d, 17e, which are constituted by vertical edge portions of the sleeve carrier and which limit the shifting movement of the sleeve carrier in both directions. The piston rods 30' are axially fixed by screws 31 in the sleeves of the sleeve carrier.

Figure 8:
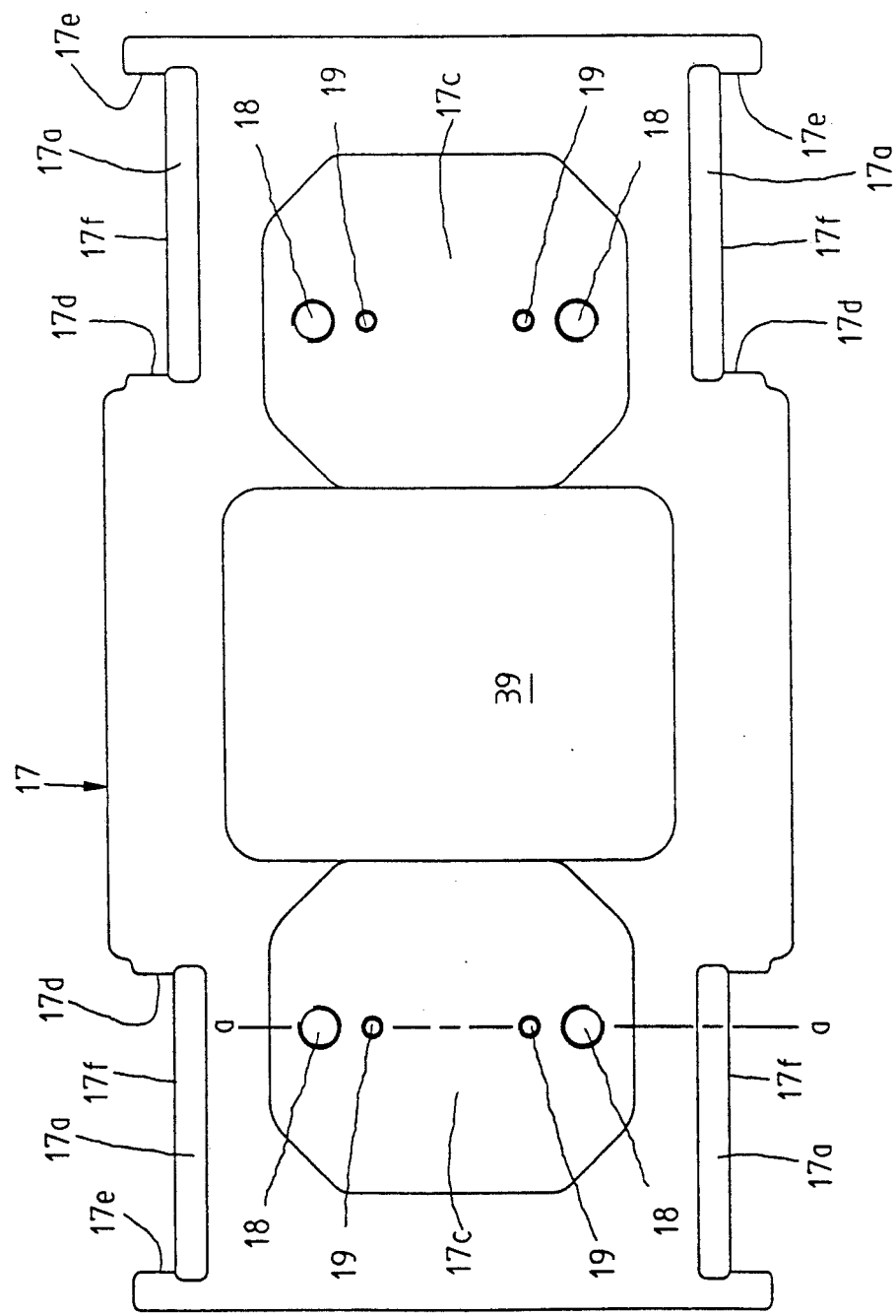
Figure 11:
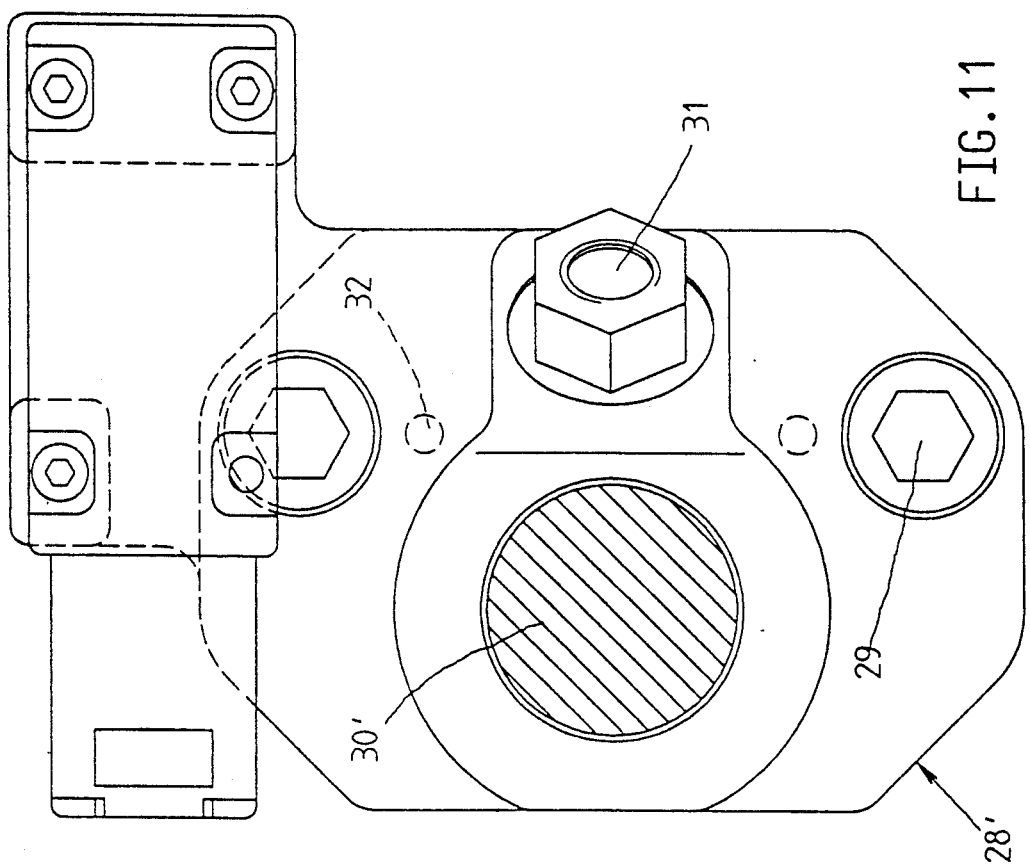
FIGS. 10 and 11 are enlarged views showing the same elements as FIGS. 1 and 2, on the one hand, and as FIGS. 6 and 7, on the other hand.
Figure 10:
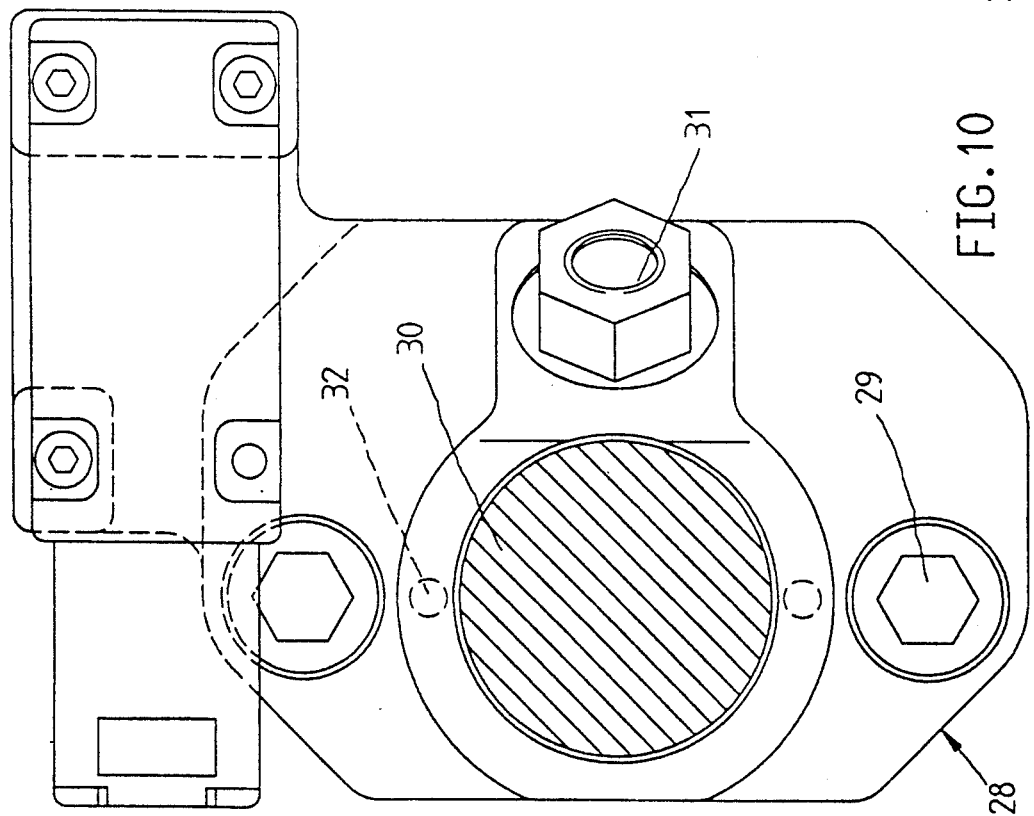

In FIG. 8, tapped bores in threaded engagement with the clamp screws 29 are designated 18 and bores for receiving the centering pins 32 of the sleeve carrier 17 are designated 19.

I claim:
1. In an injection molding machine including
an injecting unit defining a horizontal injection axis and having a plasticizing cylinder centered on and movable along said injection axis, said injecting unit being mounted to be movable in a horizontal shifting direction at right angles to said injection axis to a plurality of injecting positions between two extreme injecting positions for selectively discharging in said injecting positions plastic material out of said plasticizing cylinder along said injection axis on a plurality of parallel paths, a stationary vertical mold carrier for selectively carrying on one side thereof a center gate mold section having a central gate and an off-center gate mold section having an off-center gate, said stationary vertical mold carrier facing said injecting unit and having a cylinder-receiving opening for receiving said plasticizing cylinder in each of said injecting positions of said injecting unit and for exposing said gates of any of said mold sections mounted on said mold carrier, said opening being elongated in said shifting direction, at least one hydraulic advance-retract cylinder operable to move said plasticizing cylinder along said injection axis into and out of engagement with any of said mold sections when one of the mold sections is mounted on said mold carrier each cylinder comprising a piston rod extending beside said cylinder-receiving opening and having a moldside end coupled to said mold carrier, and rod-fixing means for axially fixing said piston rod in a current position, the improvement comprising a sleeve carrier disposed on that side of said mold carrier which faces said injecting unit and carries at least one sleeve containing and fixed to said moldside end of said piston rod, further wherein said mold carrier is provided with guiding means for guiding said sleeve carrier as said injecting unit is shifted between said two extreme injecting positions, said sleeve carrier having an opening to receive said plasticizing cylinder in all said injection positions of said injecting unit, and said sleeve carrier substantially covering said cylinder-receiving opening of said mold carrier in any area currently not occupied by said plasticizing cylinder.

2. In a mold carrier for use as a vertical stationary mold carrier in an injection molding machine, the machine including an injecting unit defining a horizontal injection axis and having a plasticizing cylinder centered on and movable along said injection axis, said injecting unit being mounted to be movable in a horizontal shifting direction at right angles to said injection axis to a plurality of injecting positions between two extreme injecting positions for selectively discharging in said injecting positions plastic material out of said plasticizing cylinder along said injection axis on a plurality of parallel paths, said mold carrier selectively carrying on one side thereof a stationary center gate mold section having a central gate and defining a central mold cavity and a stationary off-center gate mold section having an off-center gate and defining a central mold cavity, said mold carrier having a horizontal axis of symmetry and a cylinder-receiving opening being substantially symmetrical to said horizontal axis of symmetry for exposing said gates of any said stationary mold sections mounted on said mold carrier, the improvement wherein said mold carrier is provided on the side which is opposite to said one side with a sleeve carrier carrying at least one sleeve having an axis extending substantially in said horizontal plane of symmetry of said mold carrier, said mold carrier is provided with guiding means for horizontally guiding said sleeve carrier as said injecting unit is shifted between said two extreme injecting positions, said sleeve carrier has an opening to receive said plasticizing cylinder in all said injection positions of said injecting unit, and said sleeve carrier substantially covers said cylinder-receiving opening of said mold carrier in any area currently not occupied by said plasticizing cylinder.

3. The mold carrier set forth in claim 2, wherein said sleeve carrier to plate-like and has top and bottom longitudinal edge portions, which comprise first surface-ground portions facing said mold carrier and second surface-ground portions facing away from said mold carrier, said guiding means comprise guiding elements, which are mounted on said mold carrier and face said first and second surface-ground portions, and clamping means are provided for forcing said guiding elements against said second surface-ground portions to clamp said sleeve carrier against said mold carrier in different position of said sleeve carrier and mold carrier relative to each other.

4. The mold carrier set forth in claim 3, wherein said guiding elements are cylindrical and are formed with first and second recesses having the shape of segments of a cylinder and defining horizontal and vertical guiding surfaces, respectively.

said guiding elements are provided with axial centering flanges, said mold carrier is formed on the side facing said sleeve carrier with centering recesses for receiving and centering said centering flanges, and said clamping means comprise fixing screws, which extend through said guiding elements and are coaxial to said centering flanges and screwed into said mold carrier.

5. The mold carrier set forth in claim 4, wherein said mold carrier is formed on the side facing said sleeve carrier with a plurality of sets of tapped bores, each of which is coaxially surrounded by one of said centering recesses and adapted to threadedly engage one of said fixing screws, corresponding bores of said sets are spaced apart in said horizontal shifting direction, said tapped bores of one of said sets are so disposed that they are threadedly engageable by said fixing screws when said injecting unit is in a position for injecting into said center gate mold section, and said tapped bores of any other of said sets are so disposed that they are threadedly engageable by said fixing screws when said injecting unit is in a position for injecting into any of said off-center gate mold sections.

6. The mold carrier set forth in claim 2, wherein said sleeve carrier formed with two surface-ground clamping surfaces facing away from said mold carrier and spaced apart in said shifting direction, each said sleeve is integrally formed with a sleeve element, clamp screws are provided for clamping sleeve element against said clamping surfaces of said sleeve carrier, said sleeve carrier comprises centering pins for centering each sleeve element, and two of said centering pins are associated and vertically aligned with each of said clamp screws.

7. The mold carrier set forth in claim 6, wherein two sleeve elements are provided; further wherein said two sleeve elements constitute a first pair and are mounted on said sleeve carrier with respective sleeves having a first spacing and are adapted to be replaced by a second pair of such sleeve elements, which are adapted to be mounted on said sleeve carrier with the sleeves of said second pair having a second spacing, which differs from said first spacing.

8. The mold carrier set forth in claim 7, wherein said sleeves of said second pair differ in inside diameter from said sleeves of said first pair.

9. The mold carrier set forth in claim 6, wherein two sleeve elements are provided, further wherein said two sleeve elements constitute a first pair and are adapted to be replaced by a second pair of such sleeve elements, the sleeves of which differ in inside diameter from said sleeves of said first pair.

10. The mold carrier set forth in claim 2, wherein said sleeve carrier comprises two juxtaposed identical parts, both of which define said opening of said sleeve carrier on opposite sides of said opening.

11. The mold carrier set forth in claim 2, wherein said sleeve carrier is integrally formed with said at least one sleeve.

12. The mold carrier set forth in claim 2, wherein said sleeve carrier is detachably mounted on said mold carrier and is adapted to be replaced by a second such sleeve carrier, which carries sleeves having a sleeve spacing which differs from the sleeve spacing of the first-mentioned sleeve carrier.

13. The mold carrier set forth in claim 12, wherein the sleeves carried by the second sleeve carrier differ in inside diameter from the sleeves carried by the first-mentioned sleeve carrier.

14. The mold carrier set forth in claim 2, wherein said sleeve carrier is detachably mounted on said mold carrier and is adapted to be replaced by a second such sleeve carrier, which carries sleeves which differ in inside diameter from the sleeves carried by the first-mentioned sleeve carrier.

15. The mold carrier set forth in claim 2, wherein said guiding means have vertical guiding surfaces facing said sleeve carrier on the side facing said mold carrier, said sleeve carrier is movable along said guiding means with a backlash in the direction of said injection axis, and clamping means are provided for forcing said sleeve carrier against said vertical guiding surfaces in a plurality of positions of said sleeve carrier and mold carrier relative to each other.

16. The mold carrier set forth in claim 2, wherein said sleeve carrier is designed to cover approximately one-half of the area of said cylinder-receiving opening when said injecting unit is in each of said two extreme injecting positions.

17. The injecting molding machine as defined in claim 1, wherein the mold carrier has a horizontal axis of symmetry and said opening is substantially symmetrical to said horizontal axis of symmetry.

18. The injection molding machine as defined in claim 1, wherein said mold carrier has a horizontal plane of symmetry; said piston rod extends in said horizontal plane of symmetry.

19. The injection molding machine as defined in claim 1, wherein said guiding means includes means for horizontally guiding said sleeve carrier.

* * * * *